United States Patent
Wang et al.

(10) Patent No.: US 10,326,275 B2
(45) Date of Patent: Jun. 18, 2019

(54) METHOD FOR CONTROLLING ZERO SEQUENCE VOLTAGE OF VOLTAGE SOURCE CONVERTER

(71) Applicants: NR ELECTRIC CO., LTD, Jiangsu (CN); NR ENGINEERING CO., LTD, Jiangsu (CN)

(72) Inventors: Ke Wang, Jiangsu (CN); Gang Li, Jiangsu (CN); Yu Lu, Jiangsu (CN); Yunlong Dong, Jiangsu (CN); Jiang Lu, Jiangsu (CN); Zhaoqing Hu, Jiangsu (CN); Tiangui Jiang, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/086,317

(22) PCT Filed: Apr. 19, 2017

(86) PCT No.: PCT/CN2017/080998
§ 371 (c)(1),
(2) Date: Sep. 19, 2018

(87) PCT Pub. No.: WO2017/181946
PCT Pub. Date: Oct. 26, 2017

(65) Prior Publication Data
US 2019/0109459 A1    Apr. 11, 2019

(30) Foreign Application Priority Data

Apr. 20, 2016  (CN) .......................... 2016 1 0249955

(51) Int. Cl.
*H02J 3/36*    (2006.01)
*H02M 1/32*    (2007.01)
(Continued)

(52) U.S. Cl.
CPC ................. *H02J 3/36* (2013.01); *H02M 1/32* (2013.01); *H02M 7/12* (2013.01); *H02M 7/48* (2013.01);
(Continued)

(58) Field of Classification Search
CPC .. H02J 3/36; H02J 3/338; H02M 1/12; H02M 7/4835
(Continued)

(56) References Cited

U.S. PATENT DOCUMENTS 4,812,729 A * 3/1989 Ito ........................ H02H 7/1216
                                                        318/732
6,172,488 B1 * 1/2001 Mizutani ............... H02J 3/1814
                                                        323/207
(Continued)

FOREIGN PATENT DOCUMENTS

CN    102170140    8/2011
CN    102185331    9/2011
(Continued)

OTHER PUBLICATIONS

Song; Hong-Seok et al., "Dual Current Control Scheme for PWM Converter under Unbalance Input Voltage Conditions," IEEE Transaction on Industrial Electronics, vol. 46, No. 5, Oct. 1999, pp. 953-959.
(Continued)

*Primary Examiner* — Rajnikant B Patel
(74) *Attorney, Agent, or Firm* — JCIPRNET

(57) ABSTRACT

Provided is a method for controlling a zero sequence voltage of a voltage source converter. When an alternating current system ground fault occurs, a zero sequence voltage at an alternating current (AC) side or a zero sequence voltage at a direct current (DC) side of a converter is detected. If the detected zero sequence voltage is greater than a set value
(Continued)

V0ref, a DC side voltage of the converter can be increased to a set value Udc0, thereby generating an appropriate reference wave at the AC side of the converter to match an AC voltage, and accordingly controlling overmodulation of a reference wave at a faulty station to suppress fluctuation of a DC voltage.

7 Claims, 1 Drawing Sheet

(51) Int. Cl.
*H02M 7/48* (2007.01)
*H02M 7/12* (2006.01)
*H02M 1/00* (2006.01)

(52) U.S. Cl.
CPC ............ *H02M 2001/0003* (2013.01); *H02M 2001/0058* (2013.01)

(58) Field of Classification Search
USPC ....... 363/34–40, 53, 65, 125, 127, 131, 132; 323/205, 207
See application file for complete search history.

(56) References Cited

U.S. PATENT DOCUMENTS

| | | | | |
|---|---|---|---|---|
| 8,416,595 | B2 * | 4/2013 | Hasler | H02J 3/1857 323/208 |
| 9,048,691 | B2 * | 6/2015 | Crane | H02J 3/36 |
| 10,184,452 | B2 * | 1/2019 | Tahata | H02P 9/00 |
| 2015/0155716 | A1 | 6/2015 | Balda | |

FOREIGN PATENT DOCUMENTS

| | | |
|---|---|---|
| CN | 102332809 | 1/2012 |
| CN | 102820671 | 12/2012 |
| CN | 104811067 | 7/2015 |
| CN | 105896584 | 8/2016 |

OTHER PUBLICATIONS

Chen; Hai-Rong, "Control and Protection of VSC Based HVDC System under AC System Fault Conditions," Zhejiang University, College of Electrical Engineering, Jan. 2007, pp. 1-187.

"International Search Report (Form PCT/ISA/210)", dated Jul. 12, 2017, with English translation thereof, pp. 1-4.

* cited by examiner

METHOD FOR CONTROLLING ZERO SEQUENCE VOLTAGE OF VOLTAGE SOURCE CONVERTER

CROSS-REFERENCE TO RELATED APPLICATION

This application is a 371 of international application of PCT application serial no. PCT/CN2017/080998, filed on Apr. 19, 2017, which claims the priority benefit of China application no. 201610249955.X, filed on Apr. 20, 2016. The entirety of each of the above-mentioned patent applications is hereby incorporated by reference herein and made a part of this specification.

FIELD OF THE INVENTION

The present invention relates to the field of flexible direct current (DC) transmission technologies of an electric power system, and in particular, to a method and device for controlling a zero sequence voltage of a voltage source converter.

DESCRIPTION OF RELATED ART

In flexible direct current (DC) transmission, a voltage source converter is used, which can independently and rapidly control active power and reactive power of a system, thus improving system stability, suppressing fluctuation of a system frequency and voltage, and enhancing steady-state performance of a grid-connected alternating current (AC) system.

For a converter station that is ungrounded, high resistance, or its valve side is grounded through an arc suppression coil, a faulty station generates a zero sequence voltage if a single-phase ground fault occurs in an AC system, and a non-faulty phase voltage of the AC system is likely to become $\sqrt{3}$ times the value of the original one. In this case, if a DC voltage is remained unchanged, a generated reference wave probably cannot reach a value that is $\sqrt{3}$ times that of a rated phase voltage. Consequently, overmodulation occurs, fluctuation of a DC side voltage is caused, and a zero sequence voltage like that in the faulty station may occur in other non-faulty converter stations connected to the DC power grid, thus bringing an adverse effect on secure operation of the flexible DC transmission system.

Currently, Song Hong-Seok et al. propose "Dual Current Control Scheme for PWM Converter under Unbalance Input Voltage Conditions" (IEEE Transaction on Industrial Electronics. 1999, 46(5):953-959), where negative sequence voltage feedforward and dual-sequence current inner loop control are separately performed for an asymmetrical fault, but only a negative sequence current can be suppressed. A thesis of Dr. Hairong Chen, *Research on Control and Protection Strategy of VSC-HVDC System in AC System Fault*, gives a detailed deduction of positive and negative sequence asymmetrical faults, where by use of a dual-sequence current loop, a reference value of a negative sequence current is set for purposes of: suppression of AC side negative sequence and suppression of DC side frequency doubling, but these two purposes cannot be achieved simultaneously. The foregoing deduction and calculation are performed to control only a negative sequence situation, but do not make an analysis and research on suppression of a zero sequence voltage in a non-faulty station that is caused when a zero sequence voltage generated by a current faulty station is transmitted to a peer station.

Therefore, it is necessary to find a method for controlling a zero sequence voltage of a voltage source converter, and a corresponding device. A zero sequence voltage at an AC side is detected, a DC side voltage is increased, and an appropriate reference wave is generated to match an AC voltage, so as to control the zero sequence voltage and suppress fluctuation of a DC voltage, thus ensuring stable and secure operation of a flexible DC transmission system.

SUMMARY OF THE INVENTION

In view of the defects in the prior art, an objective of the present invention is to provide a method for controlling a zero sequence voltage of a voltage source converter. A zero sequence voltage at an alternating current (AC) side or a direct current (DC) side is detected, a DC side voltage is increased, and an appropriate reference wave is generated to match an AC voltage, so as to control overmodulation of a reference wave at a faulty station to suppress fluctuation of a DC voltage, thus ensuring stable and secure operation of a flexible DC transmission system.

To achieve the foregoing objective, the present invention adopts the following technical solutions:

A zero sequence voltage at an AC side of a converter is detected. If the zero sequence voltage is greater than a set value $V_{0ref}$, a DC side voltage of the converter can be increased to a set value $U_{dc0}$, thereby generating an appropriate reference wave at the AC side of the converter to match an AC voltage, and accordingly controlling overmodulation of a reference wave at a faulty station to suppress fluctuation of a DC voltage. There are two ways to increase the DC voltage: increasing a capacitor voltage of a sub-module to a set value $U_{c0}$, to achieve the objective of increasing the DC voltage of the converter; and investing more redundant sub-modules, to achieve the objective of increasing the DC voltage of the converter.

After use of the foregoing solution, the present invention achieves the following beneficial effects:

(1) By the method for controlling a zero sequence voltage of a voltage source converter according to the present invention, overmodulation of a reference wave at a faulty station can be controlled, and fluctuation of a DC side voltage can be reduced, thus minimizing an adverse effect of a fault in a current station on other non-faulty stations, and ensuring stable and secure operation of a flexible DC transmission system.

DETAILED DESCRIPTION OF THE INVENTION

The technical solutions of the present invention are described in detail below with reference to the accompanying drawings and specific embodiments.

The present invention provides a method for controlling a zero sequence voltage of a voltage source converter. When an alternating current (AC) system ground fault occurs, a zero sequence voltage at an AC side or a direct current (DC) side of a converter is detected. If the detected zero sequence voltage is greater than a set value $V_{0ref}$, a DC side voltage of the converter can be increased to a set value $U_{dc0}$, thereby generating an appropriate reference wave at the AC side of the converter to match an AC voltage, and accordingly controlling overmodulation of a reference wave at a faulty station to suppress fluctuation of a DC voltage.

Figure 1:
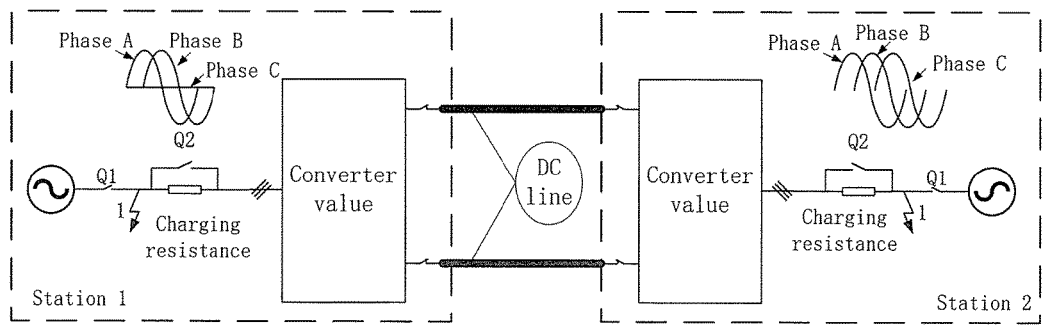
FIG. 1 is a schematic diagram of a DC system formed by voltage source converters.
Figure 2:
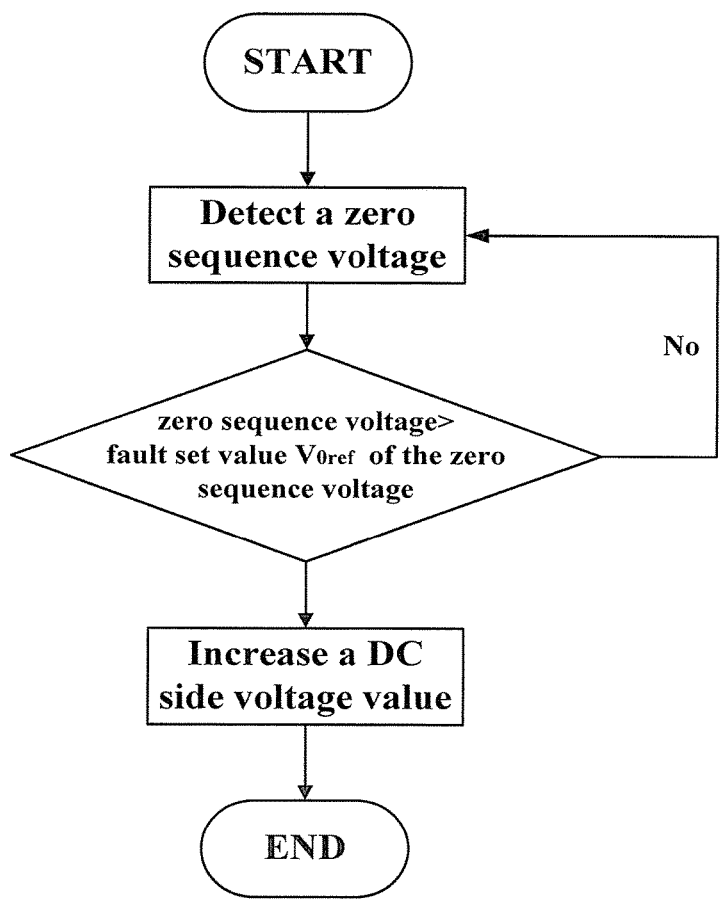
FIG. 2 is a schematic diagram showing a control over a zero sequence voltage.

According to the method described in claim 1 of the present invention, a control over a zero sequence voltage of the voltage source converter shown in FIG. 1 is described as follows:

(1) The zero sequence voltage is detected. If the zero sequence voltage is greater than a set value $V_{0ref}$, it indicates that a fault occurs. A constant DC voltage control station starts to increase a DC voltage to $U_{dc0}$, where the DC voltage meets a relational expression: $U_{dc0} > 2U_m$, $U_m$ being a non-faulty phase voltage peak at an AC side of the voltage source converter. FIG. 2 is a schematic diagram showing a control over the zero sequence voltage.

(2) The DC voltage is increased from a rated value $U_{dcN}$ to $U_{dc0}$, which can be implemented by increasing a capacitor voltage of a sub-module from $U_{cN}$ to $U_{c0}$, where $$U_{c0} = U_{cN} \times \frac{U_{dc0}}{U_{dcN}}.$$

(3) The DC voltage is increased from a rated value $U_{dcN}$ to $U_{dc0}$, which can also be implemented by increasing the number of invested sub-modules from the original $n_N$ to $n_0$, where $$n_0 = n_N \times \frac{U_{dc0}}{U_{dcN}}.$$

(4) After the constant DC voltage station increases the DC voltage, a non-constant DC voltage station connected to the constant DC voltage station needs to increase a capacitor voltage of a sub-module or increase the number of invested sub-modules, where numeric values obtained after the increase are described in steps (2) and (3).

As a further preferred solution in the specific embodiment, the zero sequence voltage can be obtained by dividing a sum of AC three-phase voltages by 3, or by dividing a sum of DC positive and negative voltages by 2. A range of a fault set value $V_{0ref}$ of the zero sequence voltage is 0.1 pu<$V_{0ref}$<1.0 pu.

As a further preferred solution in the specific embodiment, a value to which the DC side voltage is increased meets a relational expression: $U_{dc0} > 2U_m$, where $U_m$ is a non-faulty phase voltage peak.

As a further preferred solution in the specific embodiment, in a DC transmission system formed by two or more converters, when a zero sequence voltage is first detected in a particular converter station, this converter station notifies other converter stations through inter-station communication; and a constant DC voltage station increases a DC side voltage, the DC side voltage matches a voltage of a sub-module of a set power station, or the number of invested sub-modules.

A set value of the voltage of the sub-module is $U_{c0}$, and $$U_{c0} = U_{cN} \times \frac{U_{dc0}}{U_{dcN}},$$

where $U_{cN}$ is a voltage of the sub-module before the fault, and $U_{dcN}$ is a DC voltage before the fault.

The number of the invested sub-modules is $n_0$, and $$n_0 = n_N \times \frac{U_{dc0}}{U_{dcN}},$$

where $n_N$ is the number of invested sub-modules before the fault, and $U_{dcN}$ is a DC voltage before the fault.

As a further preferred solution in the specific embodiment, a sub-module structure of the converter includes a half-bridge MMC, a full-bridge MMC, or a structure approximating the full-bridge MMC.

The foregoing embodiment merely describes the technical idea of the present invention, but is not intended to limit the protection scope of the present invention. Any modification made based on the technical solutions according to the technical idea provided by the present invention falls within the protection scope of the present invention.

What is claimed is:

1. A method for controlling a zero sequence voltage of a voltage source converter, comprising:
   when an alternating current (AC) system ground fault occurs, detecting a zero sequence voltage at an AC side or at a direct current (DC) side of a converter;
   if the detected zero sequence voltage is greater than a set value $V_{0ref}$, increasing a DC side voltage of the converter to a set value $U_{dc0}$, thereby generating an appropriate reference wave at the AC side of the converter to match an AC voltage, and accordingly controlling overmodulation of a reference wave at a faulty station to suppress fluctuation of a DC voltage.

2. The method for controlling the zero sequence voltage of the voltage source converter according to claim 1, wherein the zero sequence voltage is obtained by dividing a sum of AC three-phase voltages by 3, or by dividing a sum of DC positive and negative voltages by 2, wherein and a range of a fault set value $V_{0ref}$ of the zero sequence voltage is 0.1 pu<$V_{0ref}$<1.0 pu.

3. The method for controlling the zero sequence voltage of the voltage source converter according to claim 1, wherein a value to which the DC side voltage is increased meets a relational expression: $U_{dc0} > 2U_m$, wherein $U_m$ is a non-faulty phase voltage peak.

4. The method for controlling the zero sequence voltage of the voltage source converter according to claim 1, wherein a method of increasing the DC voltage of the converter is increasing a capacitor voltage of a sub-module to a set value $U_{c0}$, and $$U_{c0} = U_{cN} \times \frac{U_{dc0}}{U_{dcN}},$$

wherein $U_{cN}$ is a voltage of the sub-module before the fault, and $U_{dcN}$ is a DC voltage before the fault.

5. The method for controlling the zero sequence voltage of the voltage source converter according to claim 1, wherein a method of increasing the DC voltage of the converter is investing more redundant sub-modules, and the number of the invested sub-modules is increased to $n_0$, and $$n_0 = n_N \times \frac{U_{dc0}}{U_{dcN}},$$

wherein $n_N$ is the number of invested sub-modules before the fault, and $U_{dcN}$ is a DC voltage before the fault.

6. The method for controlling the zero sequence voltage of the voltage source converter according to claim 1, wherein in a DC transmission system formed by two or more converters, when a zero sequence voltage is first detected in a particular converter station, this converter station notifies other converter stations through inter-station communication, and a set DC voltage station increases a DC side voltage, wherein the DC side voltage matches a voltage of a sub-module of a set power station, or the number of invested sub-modules, wherein a set value of the voltage of the sub-module is $U_{c0}$, and $$U_{c0} = U_{cN} \times \frac{U_{dc0}}{U_{dcN}},$$

wherein $U_{cN}$ is a voltage of the sub-module before the fault, and $U_{dcN}$ is a DC voltage before the fault, and wherein the number of the invested sub-modules is $n_0$, and $$n_0 = n_N \times \frac{U_{dc0}}{U_{dcN}},$$

wherein $n_N$ is the number of invested sub-modules before the fault, and $U_{dcN}$ is a DC voltage before the fault.

7. The method for controlling the zero sequence voltage of the voltage source converter according to claim 1, wherein a sub-module structure of the converter comprises a half-bridge MMC, a full-bridge MMC, or a structure approximating the full-bridge MMC.

* * * * *